(No Model.) 4 Sheets—Sheet 2.
F. P. BERGH & C. W. TARBOX.
CONDUIT ELECTRIC RAILWAY.
No. 535,936. Patented Mar. 19, 1895.
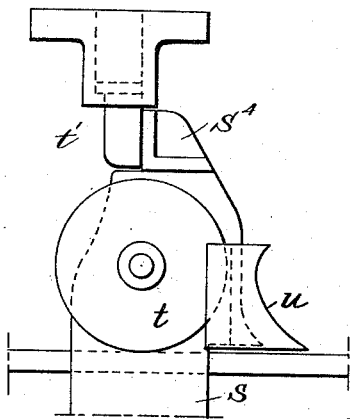
Fig. 9.
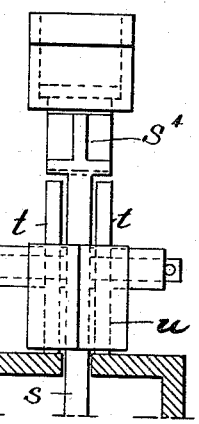
Fig. 10.
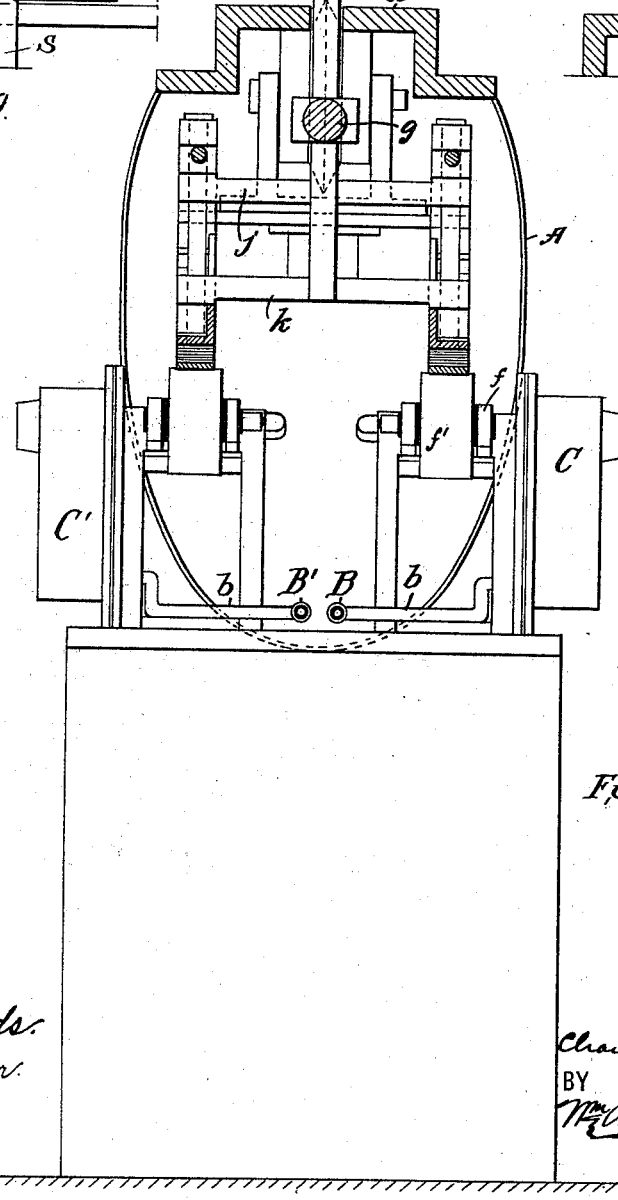
Fig. 2.
WITNESSES:
C. V. Edwards.
F. C. Lawyer.
INVENTORS
Fred P. Bergh
Charles W. Tarbox
BY
Wm. A. Rosenbaum
ATTORNEY (No Model.) 4 Sheets—Sheet 3.

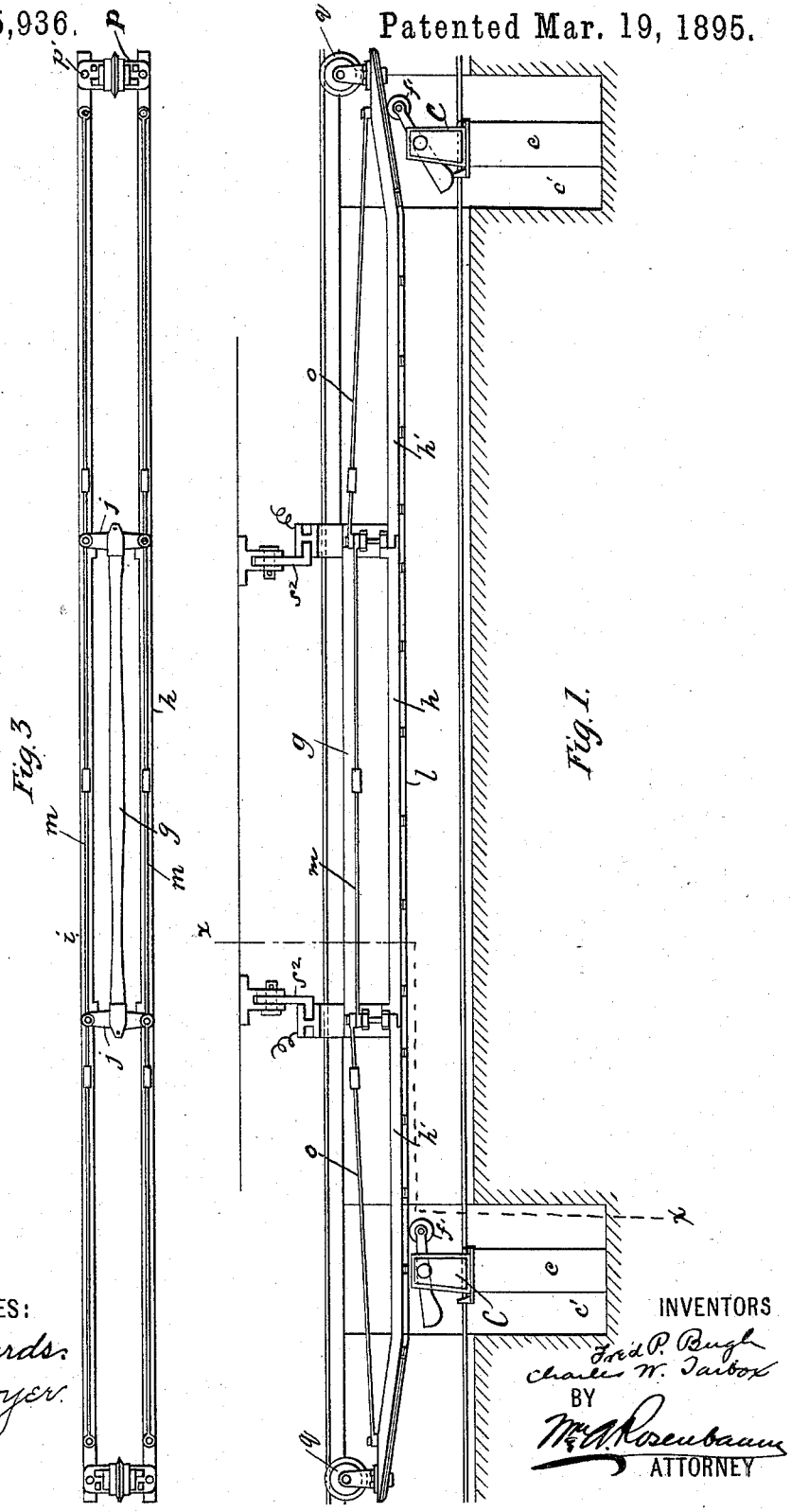

F. P. BERGH & C. W. TARBOX.
CONDUIT ELECTRIC RAILWAY.

No. 535,936. Patented Mar. 19, 1895.

WITNESSES:
C. V. Edwards.
F. C. Lawyer.

INVENTORS
Fred P. Bergh
Charles W. Tarbox
BY
Wm. A. Rosenbaum
ATTORNEY (No Model.)
F. P. BERGH & C. W. TARBOX.
CONDUIT ELECTRIC RAILWAY.
No. 535,936. Patented Mar. 19, 1895.
4 Sheets—Sheet 4.
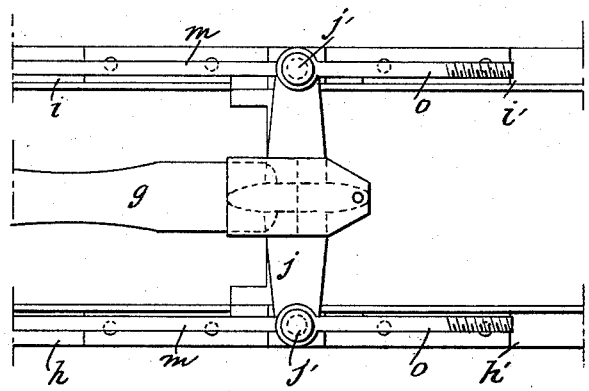
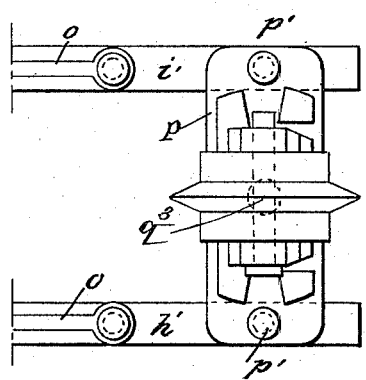
Fig. 6.
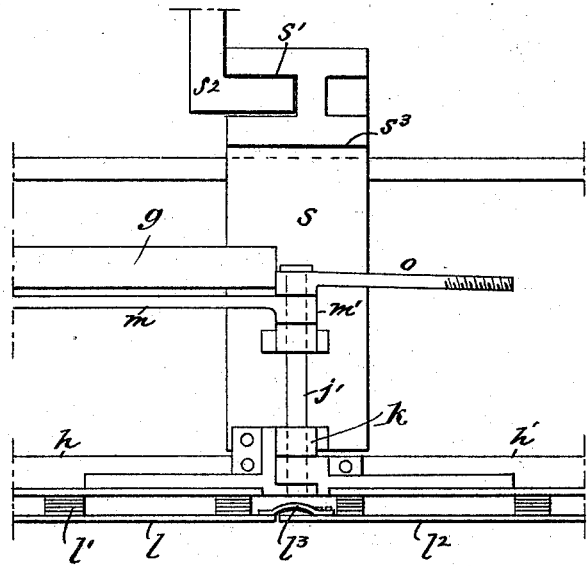
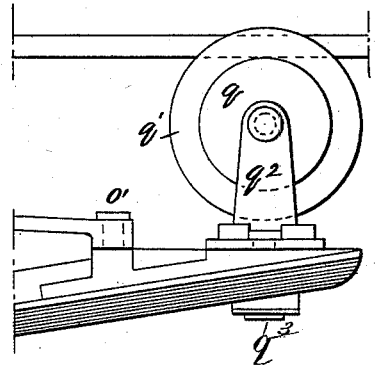
Fig. 7.
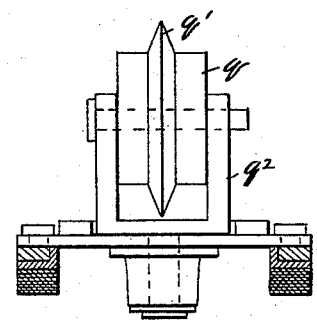
Fig. 8.
WITNESSES:
C. V. Edwards.
F. C. Lawyer.
INVENTORS
Fred P. Bergh
Charles W. Tarbox
BY
Wm. A. Rosenbaum
ATTORNEY

UNITED STATES PATENT OFFICE.

FRED P. BERGH AND CHARLES W. TARBOX, OF NEW YORK, N. Y., ASSIGNORS TO DAVID CALMAN, OF SAME PLACE.

CONDUIT ELECTRIC RAILWAY.

SPECIFICATION forming part of Letters Patent No. 535,936, dated March 19, 1895.

Application filed May 25, 1894. Serial No. 512,407. (No model.)

*To all whom it may concern:*

Be it known that we, FRED P. BERGH and CHARLES W. TARBOX, citizens of the United States, residing at New York, in the county of New York and State of New York, have invented certain new and useful Improvements in Electric Railways, of which the following is a full, clear, and exact description.

This invention relates to electric railways of the class in which current is supplied to the motor on the vehicle from a conductor of electricity located in a conduit extending along the roadway under the car. In this particular case there is no continuous working conductor, nor is there what may be called a sectional conductor, but instead we use a series of exposed points which are connected with a continuous insulated conductor by the car as it travels along and contact is maintained with at least one of these points all the time by means of a longitudinal shoe or skid carried by the car.

Our invention has to do more particularly with the construction and operation of these points and the shoe and consists of the apparatus and devices hereinafter described in detail and pointed out in the claims.

Figure 4:
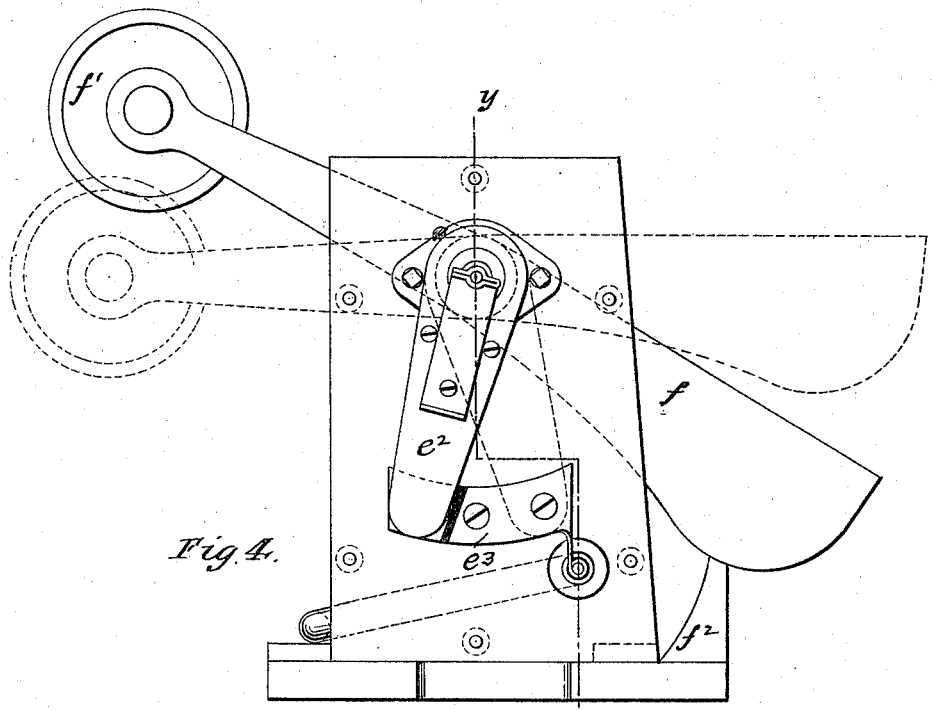
Figure 5:
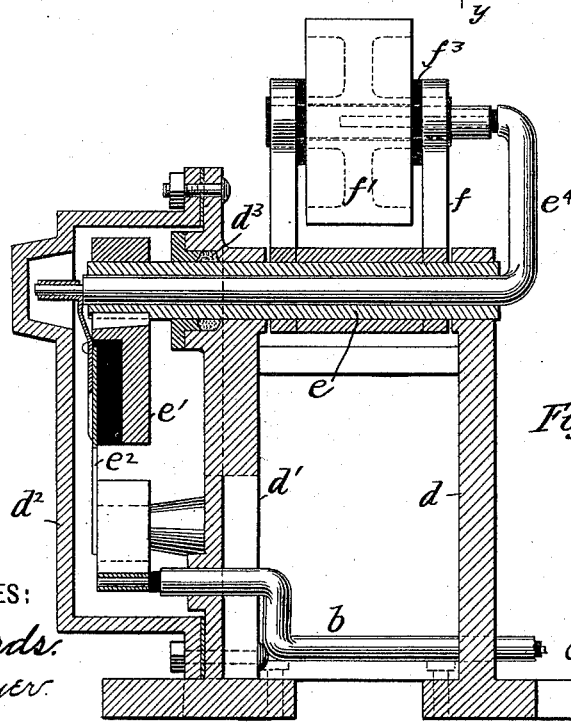

Referring to the accompanying drawings: Figure 1 represents a longitudinal section of the conduit showing the shoe and contact devices in working position. Fig. 2 is a transverse section taken on line $x$—$x$ of Fig. 1. Fig. 3 is a plan of the shoe. Fig. 4 is a side elevation of one of the switch boxes with its cover removed. Fig. 5 is a section on line $y$—$y$ of Fig. 4. Fig. 6 is a plan in detail of one end of the contact shoe, parts being broken out. Fig. 7 is a side elevation of the same, but also including the slot rail of the conduit. Fig. 8 is a front elevation of the shoe, and Figs. 9 and 10 are respectively side and front elevations of a portion of the shoe showing an attachment thereto and also a modification.

Referring to the drawings by letter, A represents the conduit which may be of any suitable shape. It is provided with the usual slot rails $a$, between which is a continuous opening to admit an arm or arms from the vehicles which run upon the tracks.

B B' respectively represent two main conductors thoroughly insulated throughout their entire length and strung along either in the conduit or buried in the earth adjacent thereto. At suitable points these conductors are tapped by branch wires $b$ which lead to switch or contact boxes C C'. One of these main wires is the positive and the other the negative, and we prefer to use metallic conductors on both sides of the circuit for various well understood reasons. Our invention, however, is applicable for use with a single feed wire and a return through the rails or ground.

One of the objects of our invention is to produce a system which is adapted for application to the present conduits of cable railways. Such conduits are usually provided at intervals with enlarged places or pits to accommodate the guide wheels of the cable. These pits are usually deeper than the conduit itself and are constructed separately therefrom. We propose to take advantage of these wheel pits by locating therein proper supports or foundations for the switch boxes C. In this way the switch boxes are supported entirely independent of the framework of the conduit and are not subject to displacement when the form of the roadbed changes by the action of frost or heavy traffic.

In Fig. 1 $c$ represents a column or foundation located in the pit $c'$ and supporting at its upper end one of the switch boxes $c$. The column may be made of masonry or iron and will be insulated from the switch box by any suitable manner. The switch box itself consists of two uprights $d$ $d'$, one of which forms one side of the box, which is completed by a cover $d^2$. The cover is bolted in place and is suitably packed at its edges to exclude moisture and air. In the upper ends of the uprights $d$ $d'$ are located the bearings for a hollow shaft $e$ which enters the box $d^2$ through a stuffing box $d^3$. Inside of the box $d^2$ the shaft carries an arm $e'$ to which is secured a metallic plate $e^2$ adapted to swing across and make and brake contact with a metallic surface $e^3$. The surface $e^3$ is electrically connected with the branch conductor $b$ which leads to the main wire B as before described. Arm $e^2$ is electrically connected with an insulated wire $e^4$ which extends through the hollow shaft $e$. Upon this shaft is mounted an arm $f$ which carries at one end a metallic roller $f'$ and at the other end a weight sufficient to normally maintain the roller in an elevated position while the weight is against a stop $f^2$. The arm $f$ is forked and between its ends the roller is mounted with suitable insulated bushings $f^3$. The conductor $e^4$ extends through the bushings and is in contact with the metallic spindle upon which the wheel turns. When the arm $e^2$ is upon the metallic surface $e^3$ a complete circuit is established from the main feeder to the wheel $f$.

We prefer to mount the switch boxes in the pits as described, and would therefore construct our conduit in this manner if the roadbed was to be equipped entirely new for our system, but our invention obviously is not limited to the location of the switch boxes in pits, as they may be placed at suitable intervals in the conduit and secured either to the bottom or sides thereof. The distance apart of the switch boxes will be determined by the length of the car to be used. The car will carry a contact shoe which will be substantially the same length and the switch boxes will be arranged so that the shoe can bridge or overlap two of them at once.

The contact shoe herein described is adapted particularly for a two-wire system. It consists in general of a frame made in three sections hinged together. The middle section, which is attached to the car, consists of three strips $g$, $h$, $i$, respectively connected at the ends to cross pieces $j$ and $k$. The strips $h$ and $i$ are in the same plane and are armed on their under sides by a flat metallic strip $l$ which is insulated from the main strip by blocks of insulating material $l'$. The strip or bar $g$ is located above the other two strips and serves merely to strengthen the shoe. The cross pieces $j$ and $k$ have connected to them standards $s$ which project upward through the slot of the conduit for connection to the vehicle. At their upper ends they are provided with grooves $s'$ into which L-shaped brackets $s^2$ carried by the car project. The grooves $s'$ on the standards face each other, and the brackets $s^2$ stand loosely therein. It will be seen that the weight of the shoe is supported by the car by means of these brackets, and that in case the car makes a sidewise movement, as it would in running off the track, the brackets $s^2$ would slip out laterally and thus save the shoe from injury. The shoe would merely drop down until the shoulders $s^3$ rested upon the slot rails. In addition to the strip $g$ the frame of the middle section of the shoe consists of two rods $m$, $m$, which are attached to the ends of the cross-pieces $j$ by means of vertical pins or rods $j'$ passing through the ends of pieces $j$ and also through the ends of the pieces $k$. The rods $m$ are provided with eyes $m'$ through which the rods $j'$ pass. The end sections of the shoe are both alike. They are merely continuations of the middle section. Each end section has strips $h'$ and $i'$ which correspond with the strips $h$ and $i$ of the middle section. They are hinged to the side strips of the middle section by means of the joint indicated in Fig. 7, of which the rods $j'$ form the pivots. The strips $h'$, $i'$, are equipped with the metallic strips $l^2$ and these are electrically connected with the strips $l$ by means of springs $l^3$. The extreme ends of the shoe are inclined upward for a short distance, for a purpose which will hereinafter appear, and this portion of the strips $h'$ and $i'$ is without a metallic contact surface. Truss rods $o$ pivoted at one end upon the rods $j'$ and at the other end upon studs $o'$ at the extremities of the shoe are provided to give strength to the shoe. The rods are fitted with turnbuckles for tightening them up and increasing the rigidity of the shoe. The ends of the shoe are connected together by cross-pieces $p$ which are fixed by pivotal pins $p'$ so that the entire end section may swing to either side for the purpose of passing around curves. In order that the shoe may be easily and accurately guided, wheels $q$ are mounted at the ends upon the cross pins $p$. These wheels are provided with flanges $q'$ which run in the slot in the conduit, and they are mounted upon a frame $q^2$ pivoted upon a vertical pin $q^3$, which permits them to turn slightly when the shoe swings. The shoe is adapted to run in either direction, as both ends are alike. From this description it will be seen that the shoe is a very light but strong structure and is capable of passing around curves of any radius over which the car can travel, without binding in the conduit.

In the operation of our system, the shoe in passing along through the conduit runs over and pushes downward the wheels $f'$. This causes the plate $e^2$ to make contact with the metallic surface $e^3$ in the switch box and closes the circuit from the main conductor through the wheel $f'$ to the metallic strip $l$ on the shoe, whence it is taken by a flexible conductor in the usual way to the motor on the vehicle. On passing out of the vehicle the return current passes through the other side of the shoe and through the corresponding switch box on the other side of the conduit. In the progress of the shoe through the conduit the wheels $f$ first come in contact with the inclined insulated end of the shoe and the wheel is therefore gently moved downward until it is thrown its full stroke, when the conducting strip $l$ runs upon it and establishes a circuit. It will therefore be seen that the contact points in the switch box are brought fully together before the circuit is completed, and sparking is thereby prevented. As soon as the forward wheel $f'$ is fully upon the contact strip $l$ the rear wheel $f$ runs on to the inclined end of the shoe and is thereby allowed to rise gently under the action of the weight at the opposite end of the arm carrying the wheel. In this way the circuit between the motor and the main conductors is never interrupted.

In Figs. 9 and 10 are illustrated one of the standards $s$ provided with two rollers $t$, $t$, one on each side, the function of which is to roll upon the slot rails of the conduit and support the weight of the shoe, thus relieving the car to that extent. The connection with the car would then be only sufficient to drag the shoe along and as shown may consist merely of a lug $t'$ attached to the car and impinging against the head $s^4$ of the standard. In these figures is also illustrated a small plow $u$ which is attached to the forward edge of the standard and acts in the nature of a cow-catcher to remove any obstructions which may be on the slot rails and which might engage with and injure the standards or other parts of the shoe.

We maintain that our system herein described is extremely simple and cheap to construct and will necessitate but slight expense to keep in repair. The displacement of one switch box does not necessarily disable the system, as the momentum of a car will carry it past any particular box. The shoe being entirely separated from the car, it is possible to remove and replace that without depriving the road of the use of the car.

We regard the detachable shoe as a valuable feature of our invention.

Having thus described our invention, we claim—

1. In a conduit electric railway system, a conduit provided with two series of contact points connected respectively with the positive and negative sides of the supply circuit, in combination with a contact shoe having two longitudinal horizontal contact surfaces making contact respectively with the two series of contact points, and each long enough to bridge at least two of said points, the two contact surfaces being located in the same horizontal plane and the shoe provided with hinges permitting it to bend in a horizontal direction and maintain its two contact surfaces parallel to each other, substantially as described.

2. The switching apparatus herein described, consisting of two standards, an arm pivoted upon a shaft having its bearings therein, with a weight at one end and an insulated contact roller at the other, a water tight box formed upon one of said standards, an electric switch located therein, the said shaft projecting through a stuffing box into said water tight box and connected with the switch therein, said shaft being hollow and the roller being electrically connected with the switch by means of a conductor passing through the hollow shaft, as set forth.

3. In an electric railway, a slotted conduit, a moving car, a contact shoe carried by said car and running entirely within the conduit, said shoe being constructed in sections hinged together and adapted to swing laterally, and a roller mounted in a pivoted frame at each end of the shoe, arranged to project into the slot of the conduit to guide the shoe around curves.

4. The contact shoe herein described, consisting of the main part having two parallel strips $h$ and $i$ with their inducting surfaces, $l$, the cross pieces $j$ and $k$, the brace rods $m$, and the end sections having corresponding parts $h'$, $i'$, $l^2$ and $o$, the end sections being hinged to the middle part in the manner described.

In testimony whereof we subscribe our signatures in presence of two witnesses.

FRED P. BERGH.
CHAS. W. TARBOX.

Witnesses:
WM. A. ROSENBAUM,
C. V. EDWARDS.